May 28, 1968     C. SALVADOR     3,384,935

CLAMPING DEVICE OF THE CLOTHESPIN TYPE

Filed Sept. 7, 1967

INVENTOR.
CARMELO SALVADOR
BY John Cyril Malloy
ATTORNEY.

United States Patent Office 3,384,935
Patented May 28, 1968

3,384,935
CLAMPING DEVICE OF THE
CLOTHESPIN TYPE
Carmelo Salvador, Las Canas 3, Buzon 12, Madrid, Spain
Filed Sept. 7, 1967, Ser. No. 666,091
6 Claims. (Cl. 24—137)

ABSTRACT OF THE DISCLOSURE

A one-piece, molded, snap-action, plastic clamping device which includes opposed jaw portions, one portion being disposed on a reference arm and the other jaw portion being disposed on a pivotally connected arm carried on the reference arm. The device includes an operator member for pivotally moving the latter jaw portion with respect to the jaw portion on the reference arm through a predetermined path of movement of the operator handle with respect to the reference arm and a system for effecting toggle-type, snap-action movement of the jaws.

This invention relates to a one-piece, molded plastic clamping device suitable for use as a clothespin; the plastic material is selected from the class which, when in a substantial cross section is rigid, yet, when in a minimum flap-type cross section, is flexible and sufficiently elastic to define hinge means for articulation of the jaws of the clamping device on manipulation of an operator means between a normal position and two positive positions, (a) a release position and (b) a clamping position or (a) a jaw-open position and (b) jaw closed and locked position.

It is accordingly, an object of this invention to provide an improved clamping device of a one-piece molded plastic construction including movable jaws and snap-action, toggle-type means to move the jaws which device includes integral flap or hinge connections.

It is another object of this invention to provide an improved clamping device of one-piece molded plastic material of the class including materials such as polypropylene or polyethylene, which device includes jaw members having gripping surfaces which are preferably yieldable to conform to an article being gripped and which includes a system of members constraining the pivotal movement of the jaws in a predetermined path of movement with respect to one another.

It is another object of this invention to provide an inexpensive claping device of plastic material which is well adapted for the purposes and uses set forth without the requirement of separate spring-type elements to facilitate the manipulation of the clamping device and which plastic material is molded so as to be reciprocably deformable to store and release energy when moved out of the normal position for subsequent release to restore the configuration of the device to the normal condition.

In accordance with these and other objects which will become apparent hereinafter, the instant invention will now be described with reference to the accompanying drawings illustrating the preferred embodiment thereof.

Figure 1:
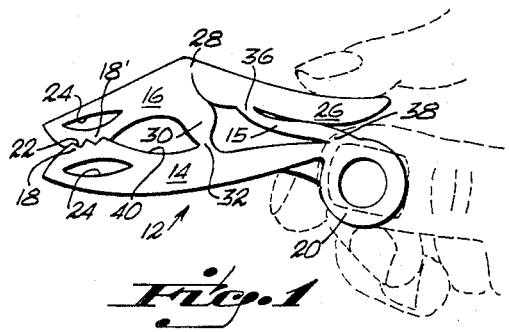
FIGURE 1 is a side elevation view of the clamping device as seen in a closed or clamping position and with pressure applied as indicated.

With reference to the drawings wherein like reference characters are designated by like or corresponding numbers throughout the different views of the drawings, and with particular reference to FIGURE 1, the clamping device is generally designated by the numeral 12. It is composed of two relatively movable arms 14 and 16 and an intermediate, snap-type connecting system including the rod member 15, which limits or constrains the relative movement of articulation of the arms to a predetermined path such that jaw portions, one on each of the arms, are adapted to be moved into and out of biting relation to two main positions, a clamping position and a release position.

One of the arms, hereinafter referred to as the reference arm 14, is of a general overall length in the order of about two inches or at least of sufficient length for manipulation of the clamping device in the manner indicated in the drawings and as will be described more fully hereinafter. The reference arm 14 includes a jaw portion 18 at one end and preferably a hanging ring 20 at the other end. The arm is stiff and substantially rigid and the occlusal or opposing surface 22 of the jaw portion is serrated defining the teeth of the jaw.

The other arm, hereinafter referred to as the bending arm 16, includes, first, an angular jaw section 18′, composed of a jaw portion and a leg portion 30 and, second, an operator handle section 26. The sections 26 and 18′ are interconnected by a hinge means 28 that is a flexible joint disposed at the crotch of the angular section 18′ between the jaw portion and a leg portion 30. The leg portion 30 of the jaw section 18′ is connected to the jaw portion 18 of the reference arm at a pivot point 32 or articulation joint; and, as seen in the drawings, the hinge means 28 is in the crotch, which is defined at the intersection of a line along the jaw portion of the section 18′ and a line along the leg portion 30. Thus, it is apparent that any swinging movement of articulation of the jaw section in a biting manipulation, i.e., opening and closing of the jaw portions of the arms, will be accompanied by a relative displacement of the hinge means 28 in an arcuate path generally about the articulation joint or pivot point 32. Such swinging of the hinge means 28 and, consequently, biting movement of the jaw portions is effected by movement of the operator handle section 26 to move the hinge means 28 about the articulation joint 32. The operator handle is constrained to limited movement as a lever about a movable fulcrum 36, the connector rod 15 acting to constrain the handle as will be described. The connector rod 15 is pivotally connected at one end thereof by a hinge joint 36 defining the fulcrum intermediate the length of the operator handle section and, on the other end thereof, by another hinge joint 38 to the end portion of the reference arm.

Figure 2:
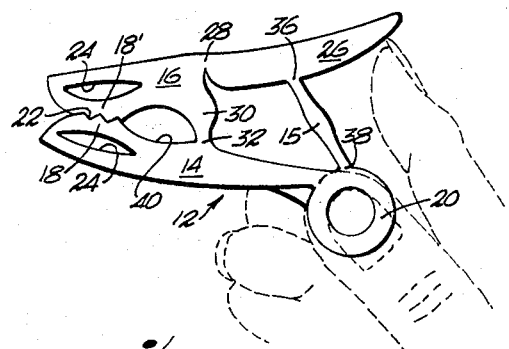
FIGURE 2 is a view similar to that of FIGURE 1 and showing the clamping device when it is in an expanded position.
Figure 3:
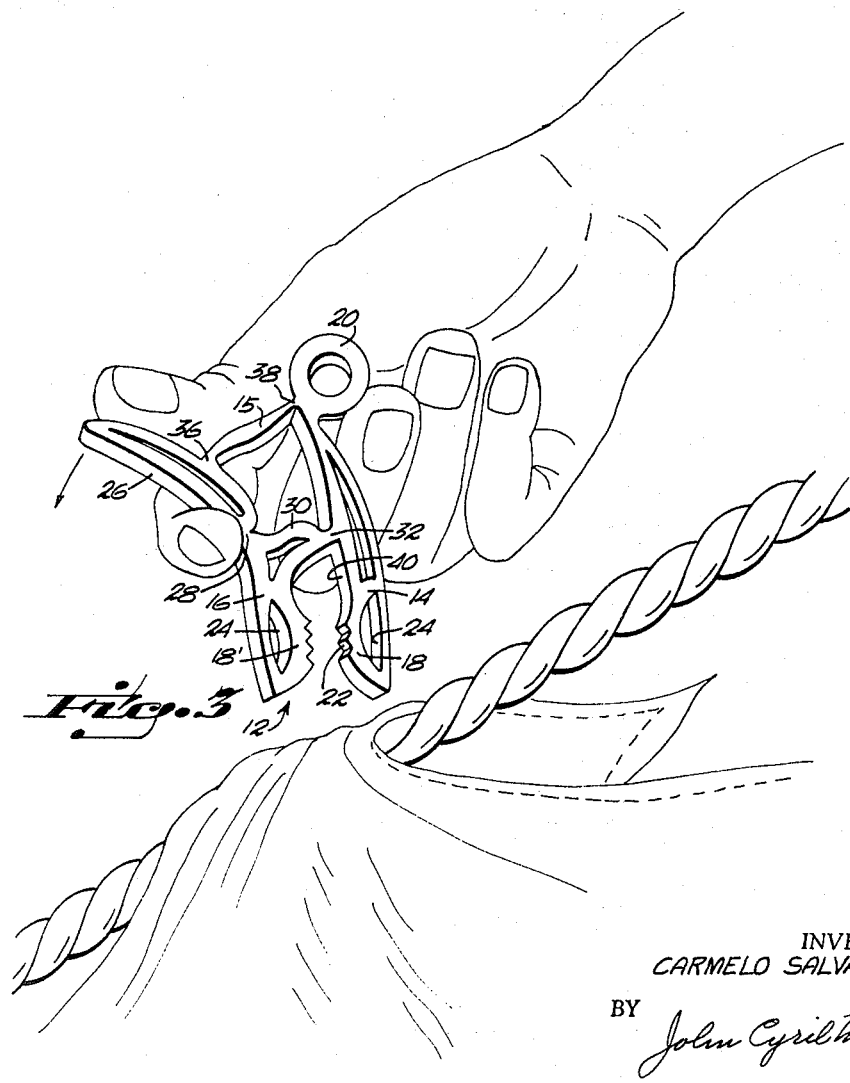
FIGURE 3 is a perspective view illustrating the application of the clamping device as a clothespin for attaching articles of clothing to a line.

By reason of this structure it will be seen upon reference to FIGURES 1, 2 and 3 that, when the arms are diverged by movement of the operator handle away from the ring end of the reference arm, the angular jaw section 18′, which includes the jaw portion and leg 30, will pivotally move as a unit about the articulation joint 32 in a swinging movement. In other words, the hinge joint 28 traces an arcuate path described about the point 32 as a center on movement of the operator handle 26 with respect to the reference arm 15. The operator means or handle 26 of the bending arm will operate as a lever which is free to move in a seesaw motion with respect to the fulcrum point 36 defined at the interconnection of the connector rod 15 at the hinge joint 36 which connector rod, in turn, is free to pivot with respect to the hinge joint 38 at the other end thereof. Referring to FIGURE 2 the clamping device is shown in the preferred normal relaxed attitude. When the operator handle 26 is moved away from the reference arm 14, as indicated in FIGURE 3, the hinge means connection 28 of the operator handle will move in a swinging arcuate path defined by a radius of curvature through the articulation joint 32 opening the jaw by moving the jaw portion of the angular jaw section into the position there shown. After an article to be clamped is gripped within the jaw, such as an article of clothing on a clothesline, the operator handle section 26 may be relaxed and the energy stored by reason of the deformation of the article will restore the device to the position shown in FIGURE 2. This latter movement may be assisted by a closing pressure on the terminal or distal end of the operator handle section to bring it toward the ring end of the reference arm to fully effect clamping. When in the position shown in FIGURE 1, it will be noted that the connection of the connector rod 15 to the operator handle 26, which is at the point designated 36, is on one side of a line joining the axis of the hinge joint 28 and the hinge joint 38. On the other hand, this point 36 moves to the other side of this line when the device is in the attitude shown in FIGURES 2 and 3; thus effecting a snap-type positive clamp position and a positive release position.

Referring to the jaw portion area of the reference arm and of the jaw section of the bending arm, it will be seen that each is provided with a hollow 24 of semi-elliptical configuration as seen in elevation for a yielding conforming tendency of the opposing jaw surfaces to accommodate to the surface being gripped in the bite and the serrations are provided to define the teeth. The device is of one-piece, molded plastic material and the various portions, the reference arm, the angular jaw section, the operator handle section, and the connector rod are of a cross section such that these elements or portions are substantially rigid. The interconnections of these elements, comprising the articulation joint and the various hinge means or joints, are of reduced cross-sectional area. The location of the hinge means permit the flap-type hinge action described and are effective to permit of the bending and flexible hinge action required to move the teeth area of the jaw portions into and out of the open position with a snap action to close the bight 40.

While the instant invention has been shown and described in what is conceived to be a practical and a preferred embodiment, it is recognized that departures may be made therefrom within the scope of the invention. Possible variation in materials, such as polypropylene, polyethylene; variation in size as well as variation in manufacturing details may be selected and are not to be limiting to the precise details disclosed herein; but, rather, this invention is to be accorded the fair scope of the claims set forth hereinafter so as to embrace any and all equivalent apparatus and articles.

What is claimed is:
1. A one-piece, snap-action, toggle-type clamping device including:
   (a) a rigid reference arm having a first jaw portion at one end and a handle portion at the other end;
   (b) a bending arm including:
      (1) a rigid, angular section comprising, an intermediate angular portion, a second jaw portion on one side of the angular portion in normal opposing relation to said first jaw portion, and a leg portion on the other side of the angular portion;
      (2) hinge means to connect the leg of the section intermediate the length of the reference arm defining a pivot for relative swinging movement of the section and carried second jaw portion out of and into biting relation to the first jaw portion of the reference arm; and
      (3) a rigid operator handle hingedly connected to said angular portion at a first point, said handle being effective to swing the jaw section about said pivot into and out of said positions of biting relation of the jaw portions; and
   (c) a toggle system interconnecting said operator handle at a first hinge joint and said other end of said reference arm at a second hinge joint such that the first hinge joint is on one side of a line between said first point and said second hinge joint when said jaws are in said normal opposing relation and said first hinge joint is on the other side of said line when said jaws are in a tightly closed position to hold the jaws in said tightly closed position, said operator arm being effective to open said jaw portions on movement of said first hinge joint on said one side of said line,
   said first hinge joint comprising a fulcrum.
2. The device as set forth in claim 1 wherein said jaw portions are serrated defining teeth.
3. The device as set forth in claim 2 wherein said jaw portions are provided with hollows for yielding deformation of said teeth for gripping when in the jaw closed and locked position.
4. The device as set forth in claim 1 wherein a hanging ring is provided on the terminal end of said handle portion of the reference arm.
5. The device as set forth in claim 1 wherein said device is of plastic material of the class including polyethylene and polypropylene.
6. The device as set forth in claim 1 wherein said toggle system comprises a connector rod interconnecting said first and said second hinge joint.

References Cited

UNITED STATES PATENTS 3,279,479 10/1966 Solomon _____ 132—46
3,292,223 12/1966 Esposito _____ 24—137

FOREIGN PATENTS 1,212,165 10/1959 France.

BOBBY R. GAY, DONALD A. GRIFFIN, Examiners.